United States Patent
Yamauchi

(10) Patent No.: US 7,705,918 B2
(45) Date of Patent: Apr. 27, 2010

(54) NOISE REDUCTION APPARATUS AND NOISE REDUCTION METHOD

(75) Inventor: Himio Yamauchi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/337,458

(22) Filed: Dec. 17, 2008

(65) Prior Publication Data

US 2010/0026896 A1   Feb. 4, 2010

(30) Foreign Application Priority Data

Aug. 4, 2008   (JP)   ............................... 2008-201140

(51) Int. Cl.
  H04N 7/01   (2006.01)
  H04N 11/20   (2006.01)
  H04N 5/00   (2006.01)
  H04N 9/64   (2006.01)

(52) U.S. Cl. ...................... 348/607; 348/441; 348/452; 348/620; 348/622; 348/700; 348/701

(58) Field of Classification Search ................. 348/607, 348/620, 622, 441, 448, 452, 700–701; 382/260
See application file for complete search history.

(56) References Cited

U.S. PATENT DOCUMENTS

| | | | | |
|---|---|---|---|---|
| 5,268,760 | A | | 12/1993 | Suyama |
| 5,446,501 | A | * | 8/1995 | Takemoto et al. ........... 348/620 |
| 5,969,777 | A | * | 10/1999 | Mawatari ................ 375/240.26 |
| 6,061,100 | A | * | 5/2000 | Ward et al. ................. 348/607 |
| 6,094,226 | A | * | 7/2000 | Ke et al. ..................... 348/446 |
| 6,281,942 | B1 | * | 8/2001 | Wang ......................... 348/607 |
| 7,050,501 | B2 | * | 5/2006 | Alvarez ................ 375/240.16 |
| 7,139,035 | B2 | * | 11/2006 | Kempf ........................ 348/607 |
| 7,158,189 | B2 | * | 1/2007 | Alvarez ...................... 348/618 |
| 7,199,838 | B2 | * | 4/2007 | Lin et al. .................... 348/607 |

(Continued)

FOREIGN PATENT DOCUMENTS

JP   H05-145802   6/1993

(Continued)

OTHER PUBLICATIONS

Notification of Rejection with English translation mailed Feb. 24, 2009 in corresponding application in Japan (Japanese Patent Application No. 2008-201140).

*Primary Examiner*—Brian P Yenke
(74) *Attorney, Agent, or Firm*—Blakely, Sokoloff, Taylor & Zafman LLP

(57) ABSTRACT

According to one embodiment, a noise reduction apparatus includes a frame delay module, first and second impulse noise detectors, first and second impulse noise reducers, a motion detector, and a noise reducer. The frame delay module delays a video signal by one frame to obtain a frame delay video signal. The first and second impulse noise detectors detect impulse noise in the video signal and the frame delay video signal. The first impulse noise reducer generates a current frame video signal by reducing the impulse noise in the video signal. The second impulse noise reducer generates a previous frame video signal by reducing the impulse noise in the frame delay video signal. The motion detector detects motion amount from the current and previous frame video signals. The noise reducer reduces noise other than the impulse noise in the current frame video signal based on the motion amount.

9 Claims, 9 Drawing Sheets

U.S. PATENT DOCUMENTS

| | | | |
|---|---|---|---|
| 7,280,161 B2 * | 10/2007 | Satou et al. | 348/701 |
| 7,551,232 B2 * | 6/2009 | Winger et al. | 348/607 |
| 2004/0012720 A1 * | 1/2004 | Alvarez | 348/607 |
| 2004/0012721 A1 * | 1/2004 | Alvarez | 348/618 |
| 2006/0056724 A1 * | 3/2006 | Le Dinh et al. | 382/274 |
| 2007/0291178 A1 * | 12/2007 | Chao et al. | 348/607 |

FOREIGN PATENT DOCUMENTS

| | | |
|---|---|---|
| JP | H05-328174 | 12/1993 |
| JP | H06-319119 | 11/1994 |
| JP | 09-018746 | 1/1997 |
| JP | H10-13718 | 1/1998 |
| JP | 2001-136416 | 5/2001 |
| JP | 2007-274532 | 10/2007 |
| JP | 2008-017021 | 1/2008 |

\* cited by examiner

NOISE REDUCTION APPARATUS AND NOISE REDUCTION METHOD

CROSS-REFERENCE TO RELATED APPLICATIONS

This application is based upon and claims the benefit of priority from Japanese Patent Application No. 2008-201140, filed Aug. 4, 2008, the entire contents of which are incorporated herein by reference.

BACKGROUND

1. Field

One embodiment of the invention relates to a noise reduction apparatus and a noise reduction method for reducing noise components of a video signal.

2. Description of the Related Art

Noise reduction apparatuses have been used to reduce noise in a signal. For example, Japanese Patent Application Publication (KOKAI) No. 2001-136416 discloses a noise reduction apparatus (a signal processing apparatus) that reduces noise. Specifically, the conventional noise reduction apparatus performs motion correction on an input video signal to obtain a motion-corrected video signal based on a motion vector detected from the input video signal. The noise reduction apparatus detects the noise level of the input video signal based on the detection result of the motion vector, and obtain a difference signal between the input video signal and the motion-corrected video signal. The noise reduction apparatus performs nonlinear processing on the difference signal with intensity corresponding to the noise level, and combines the input video signal with the difference signal subjected to the nonlinear processing. Thus, the noise reduction apparatus reduces the noise.

With the conventional noise reduction apparatus, to reduce impulse noise having a predetermined amplitude or more, the sensitivity of the motion detection is adjusted such that it becomes more likely that an image is determined to be static. This causes a ghost around a moving object, and thus, image quality degrades.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Figure 1:
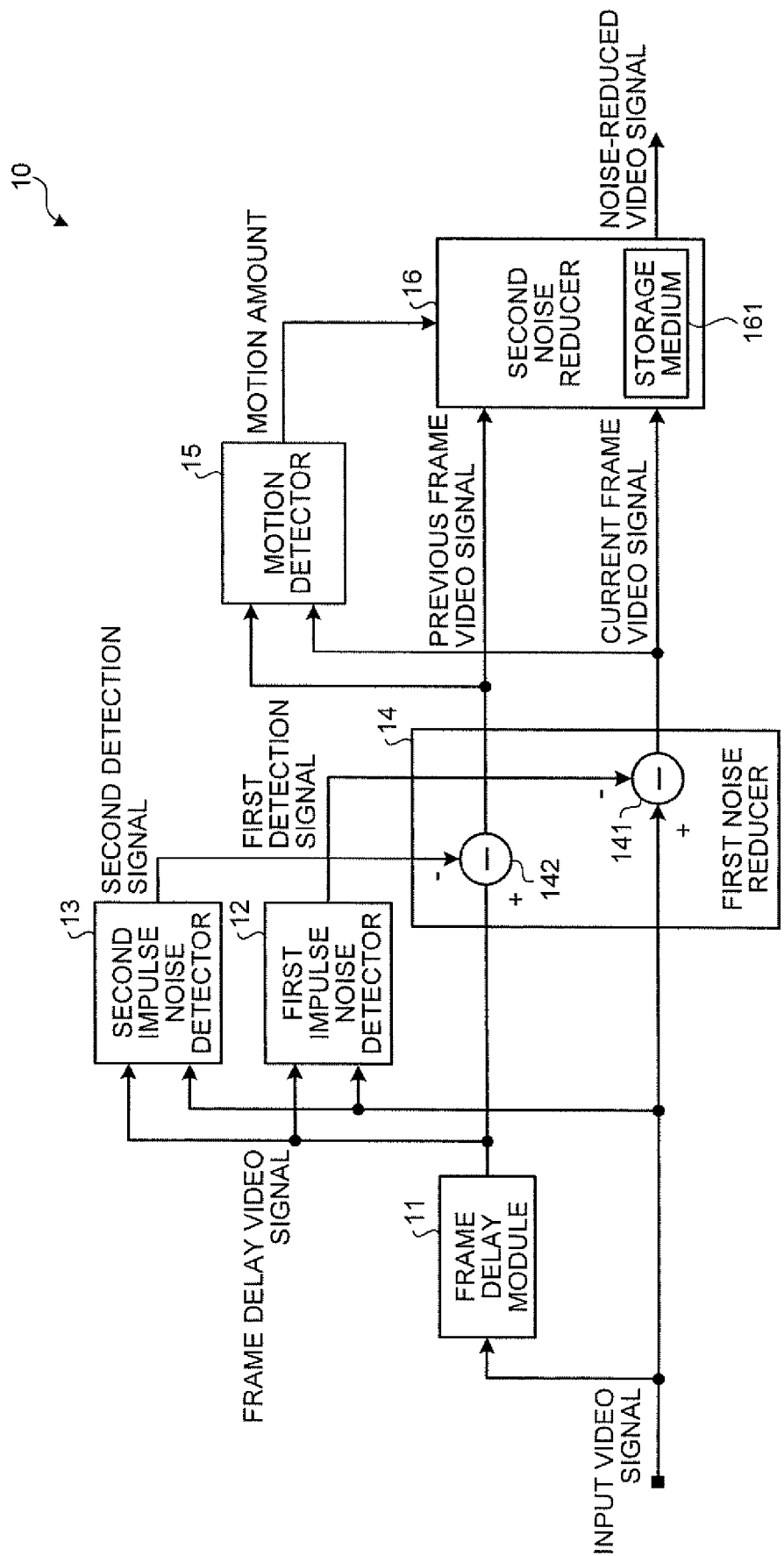
FIG. 1 is an exemplary block diagram of a noise reduction circuit according to a first embodiment of the invention.

Various embodiments according to the invention will be described hereinafter with reference to the accompanying drawings. In general, according to one embodiment of the invention, a noise reduction apparatus comprising: a frame delay module configured to, upon receiving an input video signal in frame units from outside, delay the input video signal by one frame to obtain a frame delay video signal; a first impulse noise detector configured to detect an impulse noise component in the input video signal; a second impulse noise detector configured to detect an impulse noise component in the frame delay video signal; a first impulse noise reducer configured to generate a current frame video signal by reducing the impulse noise component in the input video signal based on a detection result obtained by the first impulse noise detector; a second impulse noise reducer configured to generate a previous frame video signal by reducing the impulse noise component in the frame delay video signal based on a detection result obtained by the second impulse noise detector; a motion detector configured to detect motion in video from the current frame video signal and the previous frame video signal to obtain a motion amount indicating an amount of the motion; and a noise reducer configured to perform noise reduction on the current frame video signal to reduce noise components other than the impulse noise component with intensity corresponding to the motion amount to generate a noise-reduced video signal.

According to another embodiment of the invention, a noise reduction apparatus comprising: a frame delay module configured to, upon receiving an input video signal in frame units from outside, delay the input video signal by one frame to obtain a frame delay video signal; an impulse noise detector configured to detect an impulse noise component in the input video signal; an impulse noise reducer configured to generate a current frame video signal by reducing the impulse noise component in the input video signal based on a detection result obtained by the impulse noise detector; a motion detector configured to detect motion in video from the current frame video signal and the frame delay video signal to obtain a motion amount indicating an amount of the motion; and a noise reducer configured to perform noise reduction on the current frame video signal to reduce noise components other than the impulse noise component with intensity corresponding to the motion amount to generate a noise-reduced video signal.

According to still another embodiment of the invention, a noise reduction method comprising: delaying, upon receipt of an input video signal in frame units from outside, the input video signal by one frame to obtain a frame delay video signal; detecting an impulse noise component in the input video signal; detecting an impulse noise component in the frame delay video signal; generating a current frame video signal by reducing the impulse noise component in the input video signal; generating a previous frame video signal by reducing the impulse noise component in the frame delay video signal; detecting motion in video from the current frame video signal and the previous frame video signal to obtain a motion amount indicating an amount of the motion; and performing noise reduction on the current frame video signal to reduce noise components other than the impulse noise component with intensity corresponding to the motion amount to generate a noise-reduced video signal.

With reference to FIG. 1, a description will be given of a noise reduction apparatus 10 according to a first embodiment of the invention. FIG. 1 is a block diagram of the noise reduction apparatus 10 according to the first embodiment. As illustrated in FIG. 1, the noise reduction apparatus 10 comprises a frame delay module 11, a first impulse noise detector 12, a second impulse noise detector 13, a first noise reducer 14, a motion detector 15, and a second noise reducer 16.

The frame delay module 11 is a delay circuit such as a frame memory. The frame delay module 11 delays a video signal in frame units received from the outside (hereinafter, "input video signal") by one frame, and output it as a frame delay video signal to the first impulse noise detector 12 and the second impulse noise detector 13.

The first impulse noise detector 12 receives the frame delay video signal from the frame delay module 11 as well as receiving an input video signal from the outside. The first impulse noise detector 12 detects an impulse noise component (hereinafter, "impulse noise") in the input video signal based on a frame difference signal obtained by subtracting the frame delay video signal from the input video signal.

Figure 2:
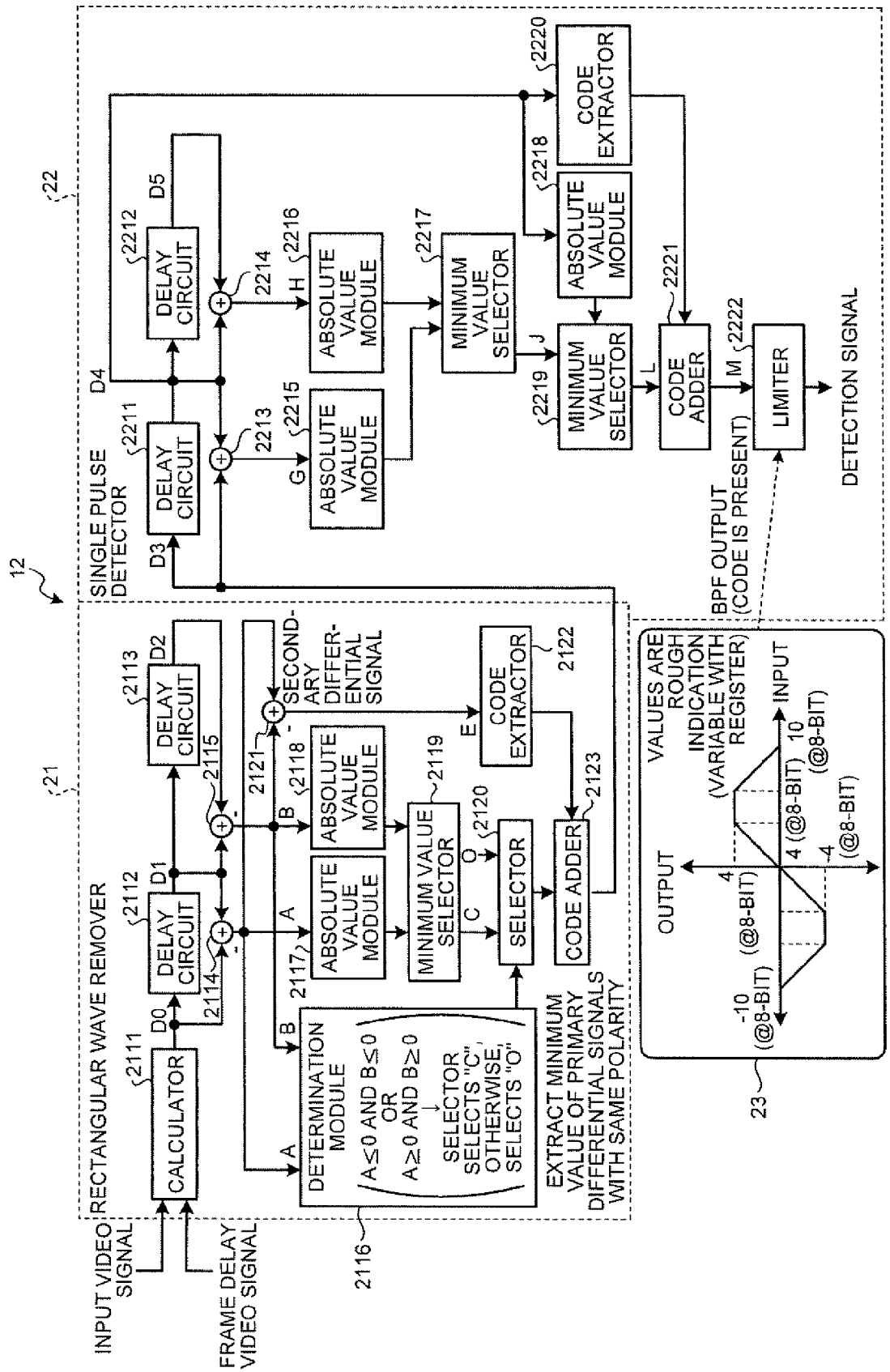
FIG. 2 is an exemplary diagram of a configuration of a first impulse noise detector illustrated in FIG. 1.

The first impulse noise detector 12 is described in detail below. FIG. 2 illustrates an example of a configuration of the first impulse noise detector 12. As illustrated in FIG. 2, the first impulse noise detector 12 comprises a rectangular wave remover 21 and a single pulse detector 22. The rectangular wave remover 21 removes a rectangular wave signal from the frame delay video signal. The single pulse detector 22 detects impulse noise (single pulse) in a signal output from the rectangular wave remover 21.

The rectangular wave remover 21 comprises a calculator 2111, a delay circuit 2112, a delay circuit 2113, an adder 2114, an adder 2115, a determination module 2116, an absolute value module 2117, an absolute value module 2118, a minimum value selector 2119, a selector 2120, an adder 2121, a code extractor 2122, and a code adder 2123.

The calculator 2111 subtracts the frame delay video signal from the input video signal, and outputs a resultant frame difference signal D0 to the delay circuit 2112. The delay circuit 2112 delays the frame difference signal D0 received from the calculator 2111 by a predetermined number of pixels, and outputs it as a delay signal D1. Having received the delay signal D1 from the delay circuit 2112, the delay circuit 2113 further delays the delay signal D1 by a predetermined number of pixels, and outputs it as a delay signal D2.

The adder 2114 adds the delay signal D1 to the negative frame difference signal D0, and outputs the result as an output A. The adder 2115 adds the delay signal D1 to the negative delay signal D2, and outputs the result as an output B.

The determination module 2116 receives the outputs A and B from the adders 2114 and 2115, respectively, and controls the output of the selector 2120 based on the values of the outputs A and B. The operation of the determination module 2116 will be described later.

The absolute value module 2117 output the absolute value of the output A from the adder 2114 to the minimum value selector 2119. Similarly, the absolute value module 2118 output the absolute value of the output B from the adder 2115 to the minimum value selector 2119. From these signals received from the absolute value modules 2117 and 2118, the minimum value selector 2119 selects, at every timing, the one having a smaller value at the same timing, and outputs it as an output C to the selector 2120.

Under the control of the determination module 2116, the selector 2120 selectively outputs the "output" C received from the minimum value selector 2119 or "0" representing null. Specifically, the determination module 2116 controls the selector 2120 to output the "output" C upon determining that the values of the outputs A and B received from the adders 2114 and 2115 satisfy the conditions $A \leqq 0$ and $B \leqq 0$, or $A \geqq 0$ and $B \geqq 0$. Otherwise, the determination module 2116 controls the selector 2120 to output "0". At this point, the determination module 2116 detects the polarities of the outputs A and B to determine whether they match. If the two polarities are different, the determination module 2116 determines that the frame difference signal D0 is a rectangular wave. In this case, the determination module 2116 controls the selector 2120 to output "0" to remove the rectangular wave component.

The adder 2121 adds up the outputs A and B received from the adders 2114 and 2115, and outputs the sum to the code extractor 2122 as a secondary differential signal E. The code extractor 2122 extracts code information from the secondary differential signal E, and outputs the code information to the code adder 2123. The term "code information" as used herein refers to information indicating whether the calculation: $(2 \cdot D1 - D0 - D2)$ results in a positive value or a negative value, and indicates whether the shape of a single pulse is convex (positive) or concave (negative).

The code adder 2123 adds a code fed from the code extractor 2122 to the output of the selector 2120, and feeds it as a signal D3 to the single pulse detector 22 at the latter stage.

Figure 3:
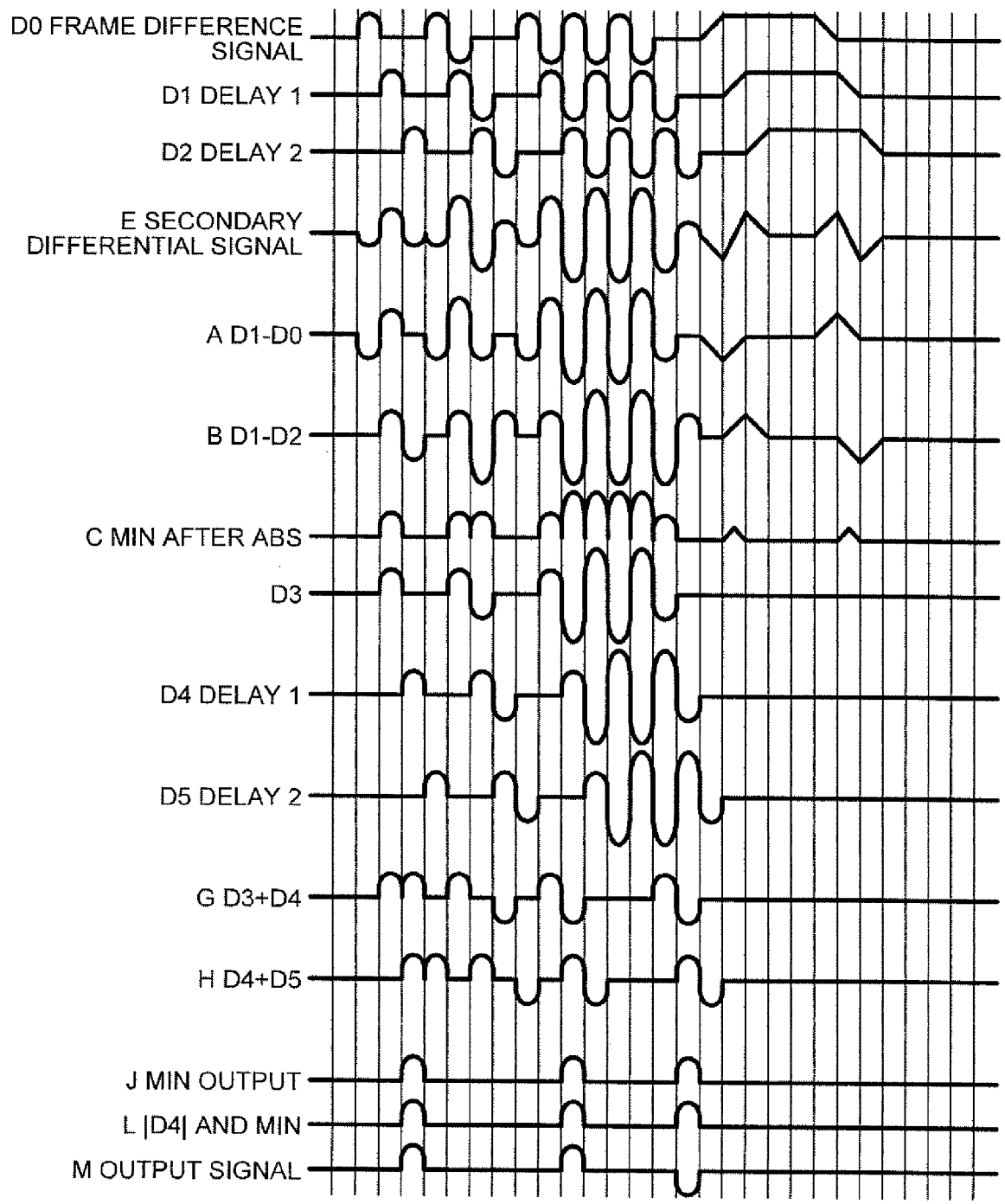
FIG. 3 is an exemplary timing chart of the operation of a rectangular wave remover and a single pulse detector illustrated in FIG. 2.
Figure 4:
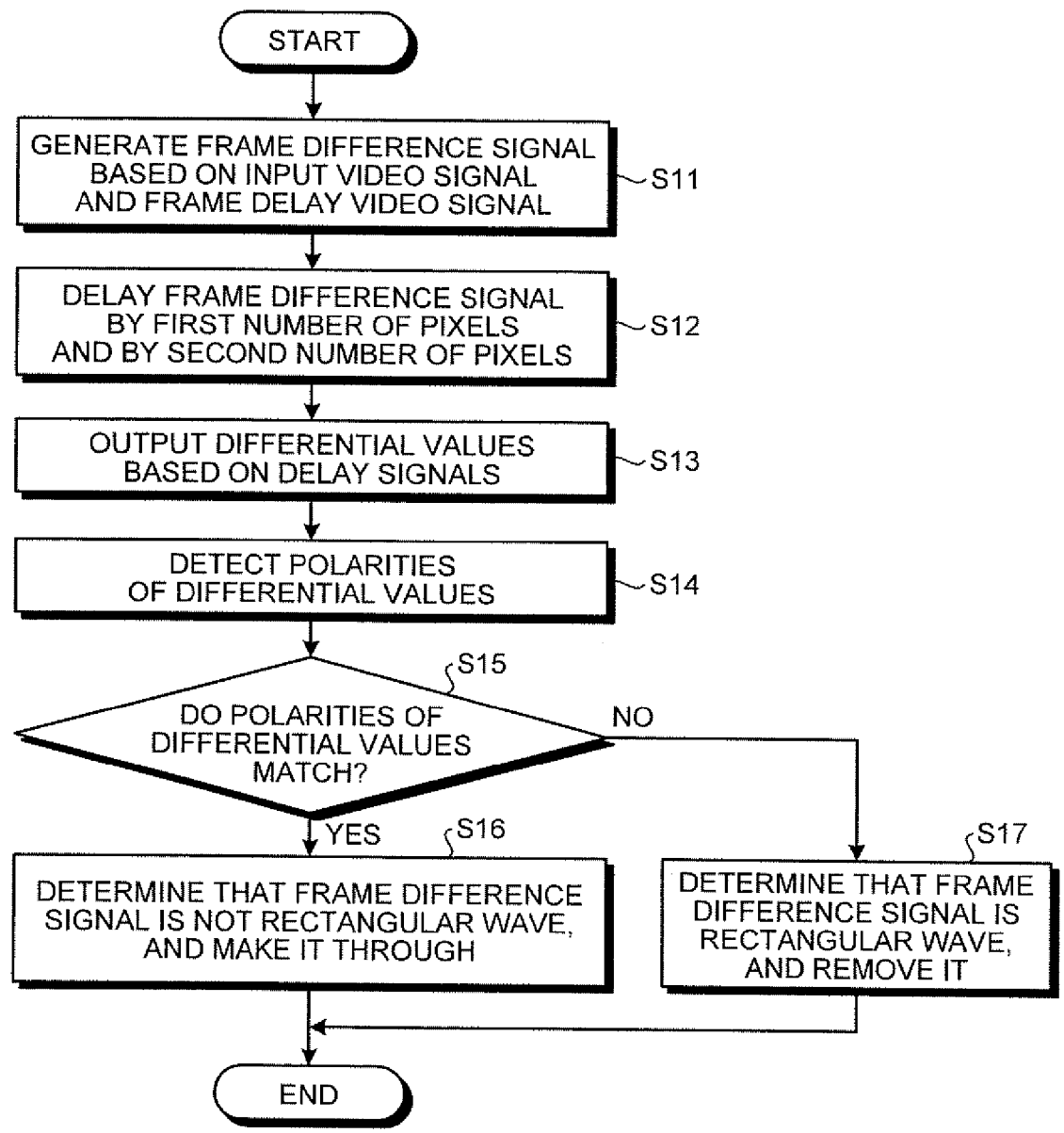
FIG. 4 is an exemplary flowchart of rectangular wave removal performed by the rectangular wave remover illustrated in FIG. 2.

With reference to FIGS. 3 and 4, a description will be given of rectangular wave removal performed by the rectangular wave remover 21. FIG. 3 is a timing chart of an example of the operation of the rectangular wave remover 21 and the single pulse detector 22. FIG. 4 is a flowchart of the procedure of rectangular wave removal performed by the rectangular wave remover 21. Respective steps in the flowchart of FIG. 4 can be replaced by circuit blocks, and thus all the steps of the flowchart can be redefined as blocks.

First, the rectangular wave remover 21 generates the frame difference signal D0 based on an input video signal and a frame delay video signal (S11). The rectangular wave remover 21 delays the frame difference signal D0 by a predetermined first number of pixels to generate the delay signal D1 as well as delaying the frame difference signal D0 by a predetermined second number of pixels to generate the delay signal D2 (S12). Thereafter, the rectangular wave remover 21 outputs two differential values (the outputs A and B) based on the frame difference signal D0, the delay signal D1, and the delay signal D2 (S13). The rectangular wave remover 21 then detects the polarities of the two differential values (S14), and determine whether they match (S15).

If the polarities of the differential values match (Yes at S15), the rectangular wave remover 21 determines that the frame difference signal D0 is not a rectangular wave, and makes it through to the latter stage (S56). On the other hand, when the polarities of the differential values are different (No at S15), the rectangular wave remover 21 determines that the frame difference signal D0 is a rectangular wave, and removes (eliminates) the rectangular wave component (S17). In this manner, the rectangular wave remover 21 removes a rectangular wave that is an obstacle to the detection of impulse noise, thus improving the detection accuracy of the single pulse detector 22 at the latter stage.

Referring back to FIG. 2, the single pulse detector 22 is described below. As illustrated in FIG. 2, the single pulse detector 22 comprises a delay circuit 2211, a delay circuit 2212, an adder 2213, an adder 2214, an absolute value module 2215, an absolute value module 2216, a minimum value selector 2217, an absolute value module 2218, a minimum value selector 2219, a code extractor 2220, a code adder 2221, and a limiter 2222.

The delay circuit 2211 delays the signal D3 output from the code adder 2123 of the rectangular wave remover 21 by a predetermined number of pixels, and outputs it as a delay signal D4. Having received the delay signal D4 from the delay circuit 2211, the delay circuit 2212 further delays the delay signal D4 by a predetermined number of pixels, and outputs it as a delay signal D5.

The adder 2213 adds the signal D3 to the delay signal D4, and outputs the resultant signal as an output G. The adder 2214 adds the delay signal D4 to the delay signal D5, and outputs the resultant signal as an output H.

The absolute value module 2215 outputs the absolute value of the output G from the adder 2213 to the minimum value selector 2217. Similarly, the absolute value module 2216 outputs the absolute value of the output H from the adder 2214 to the minimum value selector 2217. From these signals received from the absolute value modules 2215 and 2216, the minimum value selector 2217 selects, at every timing, the one having a smaller value at the same timing, and outputs it as an output J to the minimum value selector 2219. The absolute value module 2218 outputs the absolute value of the delay signal D4 to the minimum value selector 2219.

From the signals received from the minimum value selector 2217 and the absolute value module 2218, the minimum value selector 2219 selects, at every timing, the one having a smaller value at the same timing, and outputs it as an output L to the code adder 2221. The code extractor 2220 extracts code information from the delay signal D4, and outputs the code information to the code adder 2221.

The code adder 2221 adds a code fed from the code extractor 2220 to the output L from the minimum value selector 2219, and outputs it as an output signal M to the limiter 2222. The limiter 2222 limits the amplitude of the output signal M within a predetermined range as indicated by a graph 23 in FIG. 2, and outputs it as a first detection signal to the first noise reducer 14.

Figure 5:
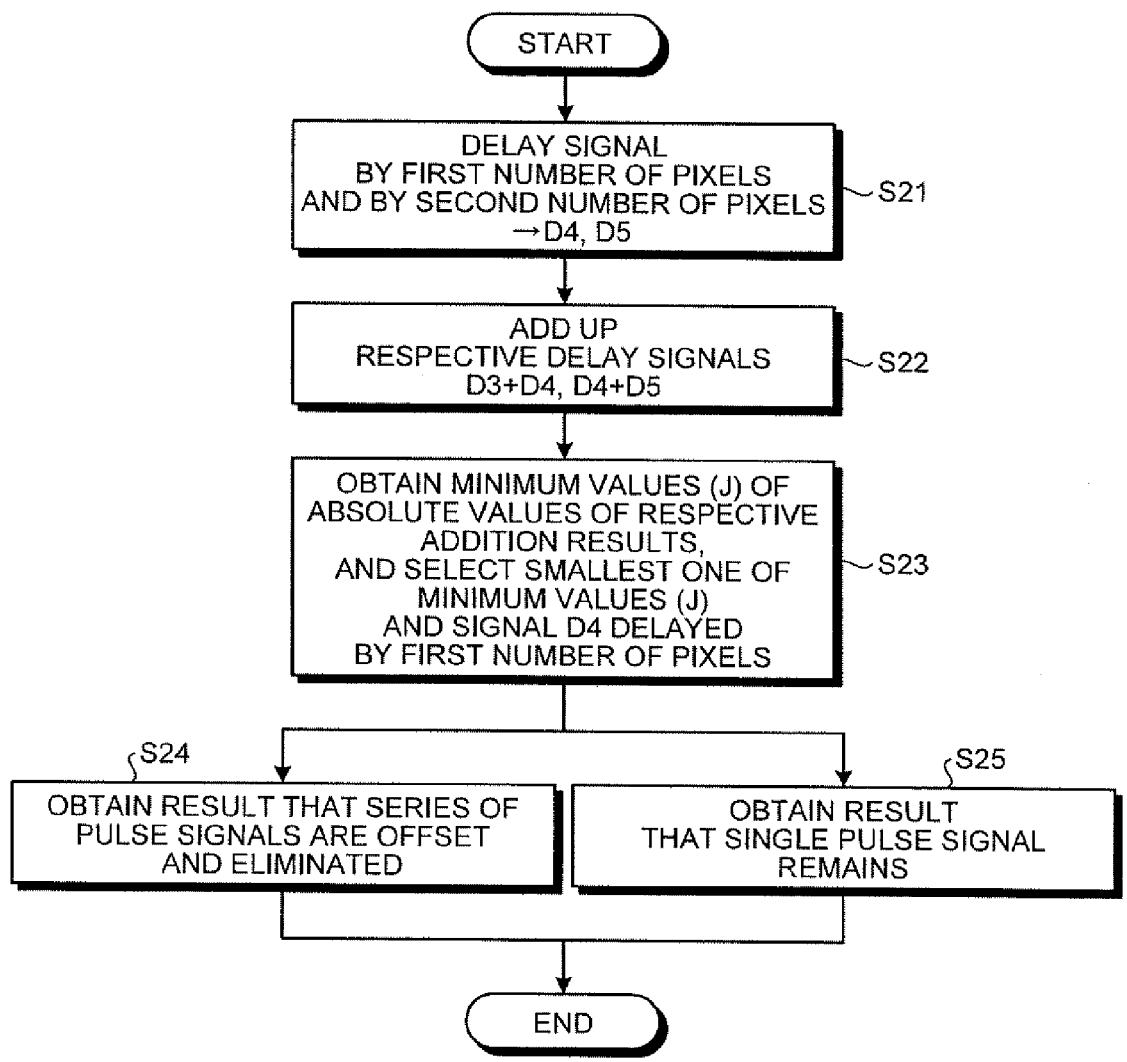
FIG. 5 is an exemplary flowchart of single pulse detection performed by the single pulse detector illustrated in FIG. 2.

With reference to FIGS. 3 and 5, a description will be given of single pulse detection performed by the single pulse detector 22. FIG. 5 is a flowchart of the procedure of single pulse detection performed by the single pulse detector 22. Respective steps in the flowchart of FIG. 5 can be replaced by circuit blocks, and thus all the steps of the flowchart can be redefined as blocks.

The single pulse detector 22 delays the signal D3 by a predetermined first number of pixels to generate the delay signal D4 as well as delaying the signal D3 by a predetermined second number of pixels to generate the delay signal D5 (S21). Thereafter, the single pulse detector 22 adds the signal D3 to the delay signal D4, and the delay signal D4 to the delay signal D5 (S22).

The single pulse detector 22 then obtains the minimum values (J) of the absolute values of the respective addition results. The single pulse detector 22 selects the smallest one of the minimum values (J) and the delay signal D4 (S23). As a result, a series of pulse signals are offset and eliminated (S24), while the single pulse signal M remains (S25).

Thus, the single pulse detector 22 can reliably detect a single pulse signal (impulse noise) in an input video signal especially by removing a rectangular wave.

A configuration for detecting impulse noise is illustrated in FIG. 2 purely by way of example and without limitation. The single pulse detector 22 as described above may be implemented using known or commonly used technologies related to impulse noise detection as disclosed in, for example, Japanese Patent Application Publication (KOKAI) No. H5-145802.

Referring back to FIG. 1, the second impulse noise detector 13 receives the frame delay video signal from the frame delay module 11 as well as an input video signal from the outside. The second impulse noise detector 13 detects impulse noise in the frame delay video signal based on a frame difference signal obtained by subtracting the input video signal from the frame delay video signal.

The second impulse noise detector 13 is of basically the same configuration and operates in a similar manner as the first impulse noise detector 12 illustrated in FIG. 2 except for the operation of the calculator 2111. More specifically, the calculator 2111 subtracts the input video signal from the frame delay video signal to detect impulse noise in the frame delay video signal. The output signal of the second impulse noise detector 13 is hereinafter referred to as a second detection signal.

The first noise reducer 14 comprises a first subtractor 141 and a second subtractor 142. The first subtractor 141 generates a current frame video signal by reducing impulse noise in the input video signal based on the detection result (the first detection signal) obtained by the first impulse noise detector 12. More specifically, the first subtractor 141 subtracts the first detection signal component from the input video signal to thereby remove impulse noise from the input video signal, and outputs it as the current frame video signal.

The second subtractor 142 generates a previous frame video signal by reducing impulse noise in the frame delay video signal based on the detection result (the second detection signal) obtained by the second impulse noise detector 13. More specifically, the second subtractor 142 subtracts the second detection signal component from the frame delay video signal to thereby remove impulse noise from the frame delay video signal, and outputs it as the previous frame video signal.

The motion detector 15 compares the current frame video signal with the previous frame video signal received from the first noise reducer 14. The motion detector 15 detects the amount of motion in the video from the previous frame video signal to the current frame video signal based on the comparison, and outputs the motion amount to the second noise reducer 16. The motion detection of the motion detector 15 may be implemented using known or commonly used technologies such as an iterative gradient method or a block matching method.

The second noise reducer 16 performs noise reduction on the output (the current frame video signal) from the first noise reducer 14 to reduce noise components other than impulse noise with intensity corresponding to the motion amount received from the motion detector 15. The second noise reducer 16 outputs a resultant signal to the outside as a noise-reduced video signal.

More specifically, the second noise reducer 16 performs noise reduction on the current frame video signal to achieve a higher noise reduction effect as the state of video indicated by the motion amount is closer to the static state (motion amount: 0). On the other hand, the second noise reducer 16 performs noise reduction so that the noise reduction effect is lower as the motion amount increases. It is herein assumed that the level of noise reduction effect is predetermined for each motion amount, and that the second noise reducer 16 is provided with a storage medium 161 such as ROM that stores in advance the noise reduction effect level in association with each motion amount as setting information.

Figure 6:
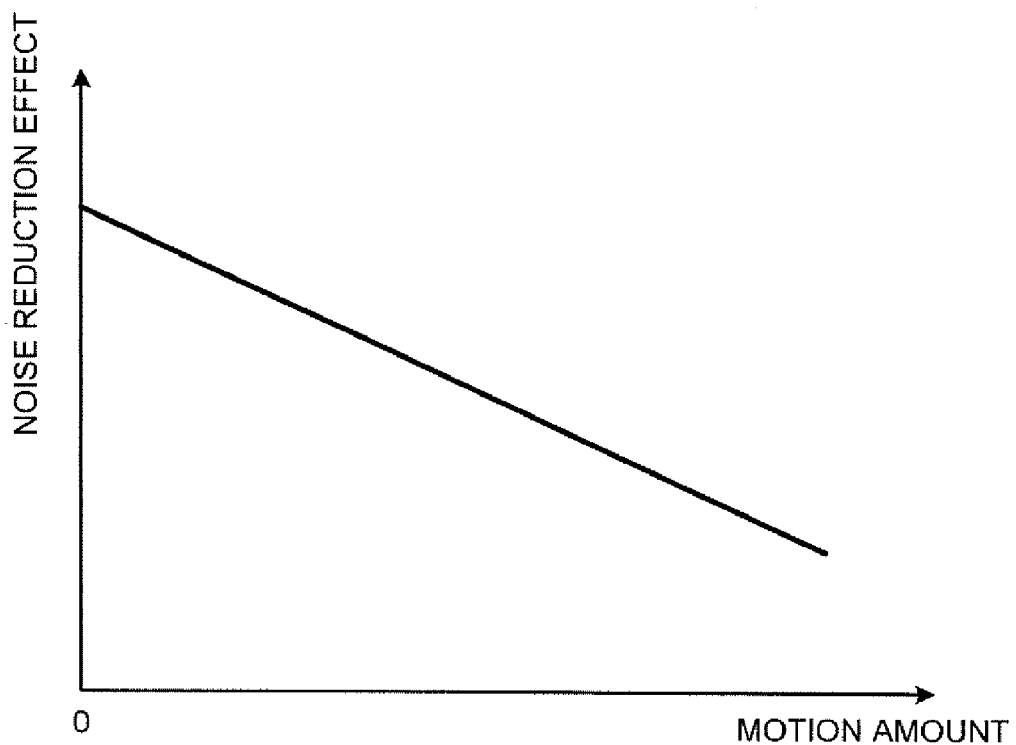
FIGS. 6 and 7 are exemplary diagrams of a relationship between the motion amount and the noise reduction effect level in the first embodiment.

FIG. 6 is a schematic diagram of an example of the setting information stored in the storage medium 161, i.e., an example of a relationship between the motion amount and the noise reduction effect level. In FIG. 6, the horizontal axis represents the motion amount, and the motion amount increases towards the left. The vertical axis represents the noise reduction effect level, and the noise reduction effect increases towards the upper side. As can be seen from FIG. 6, the setting information defines that the noise reduction effect level is set higher for less motion amount, while it is set lower for larger motion amount.

Having determined the level of noise reduction effect corresponding to the motion amount from the motion detector 15 based on the setting information stored in the storage medium 161, the second noise reducer 16 performs noise reduction to achieve the noise reduction effect at the level. The noise reduction may be performed in any manner by, for example, known or commonly used technologies using a median filter or the like. Besides, the setting information is described above as being stored in the storage medium 161 provided in the second noise reducer 16 by way of example but not of limitation. The setting information may be stored in a storage medium outside the second noise reducer 16. Further, the noise-reduced video signal output from the second noise reducer 16 may be the current frame video signal+α, i.e., the noise-reduced video signal=the current frame video signal+α (previous frame video signal−current frame video signal). Note that, in this case, when the motion amount=0 to Th1, α=1; when the motion amount=Th1 to Th2, α has a characteristic that it linearly drops from 1 to 0; and when the motion amount=Th2 or above, α=0.

As described above, according to the first embodiment, the noise reduction apparatus 10 detects the motion of video based on an input video signal (a current frame video signal) and a frame delay video signal (a previous frame video signal) from which impulse noise has been reduced. The noise reduction apparatus 10 performs noise reduction on the current frame video signal with intensity corresponding to the motion amount. Accordingly, the noise reduction apparatus 10 can reduce impulse noise components as well as other noise components from the input video signal with intensity corresponding to the video signal. Thus, it is possible to achieve a noise reduction effect suitable for the input video signal, and thereby improve the image quality of the input video signal.

While, in the example of FIG. 1, the frame delay video signal is input to the second noise reducer 16, it may not be input thereto when noise reduction is performed on the current frame video signal without using the frame delay video signal.

In the first embodiment, the noise reduction effect level is described as being controlled according to the motion amount output from the motion detector 15; however, it may be controlled according to the state of video. In this case, the state of video is classified into two states, i.e., static state and moving state, according to the motion amount, and noise reduction is performed with intensity corresponding to either one of the states.

Figure 7:
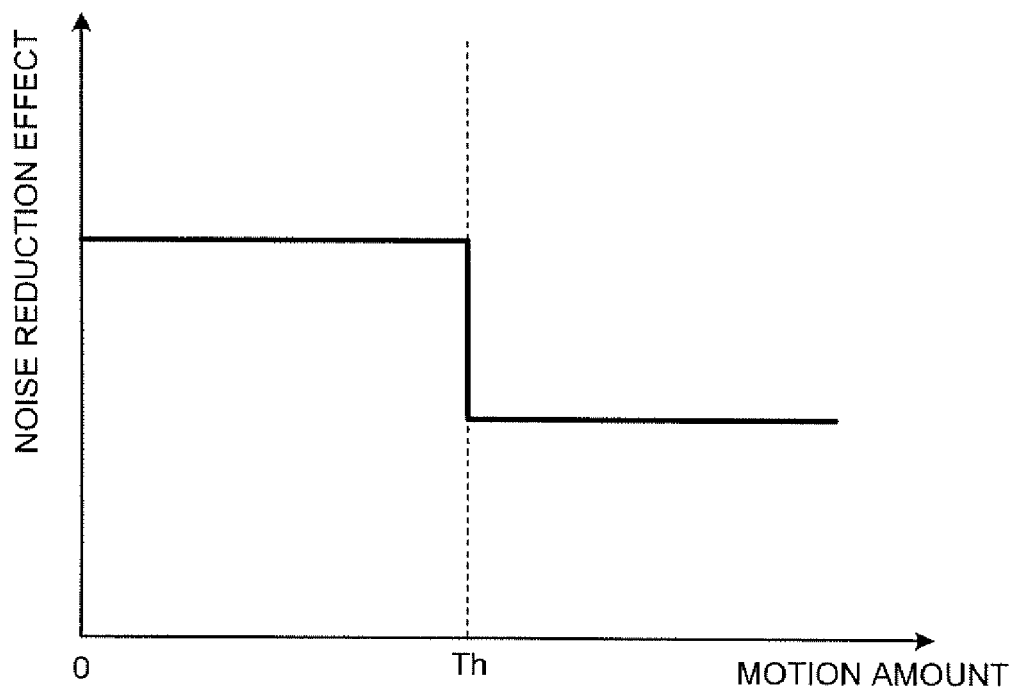

FIG. 7 is a schematic diagram of another example of the setting information, i.e., an example of a relationship between the motion amount and the noise reduction effect level. In FIG. 7, the horizontal axis represents the motion amount, and the motion amount increases towards the left. The vertical axis represents the noise reduction effect level, and the noise reduction effect increases towards the upper side. In FIG. 7, "TH" indicates a threshold for determining the state of video. The threshold Th may be stored in the storage medium 161 or another in advance. As can be seen from FIG. 7, the setting information defines that the noise reduction effect level is set higher when the motion amount indicates that the state is static. The second noise reducer 16 compares the motion amount from the motion detector 15 with the threshold Th. When the motion amount is below the threshold Th, the second noise reducer 16 determines that video is static. On the other hand, when the motion amount is equal to or above the threshold Th, the second noise reducer 16 determines that video is moving. The second noise reducer 16 then determines the level of noise reduction effect corresponding to the state thus determined based on the setting information stored in the storage medium 161, and performs noise reduction to achieve the noise reduction effect.

Namely, noise reduction is performed to achieve a noise reduction effect suitable for the state of video. This also enables reduction of impulse noise components as well as other noise components while maintaining the image quality of the video signal.

A second embodiment is described below, wherein like features or elements as those of the first embodiment are designated by like reference numerals, and their description will not be repeated.

Figure 8:
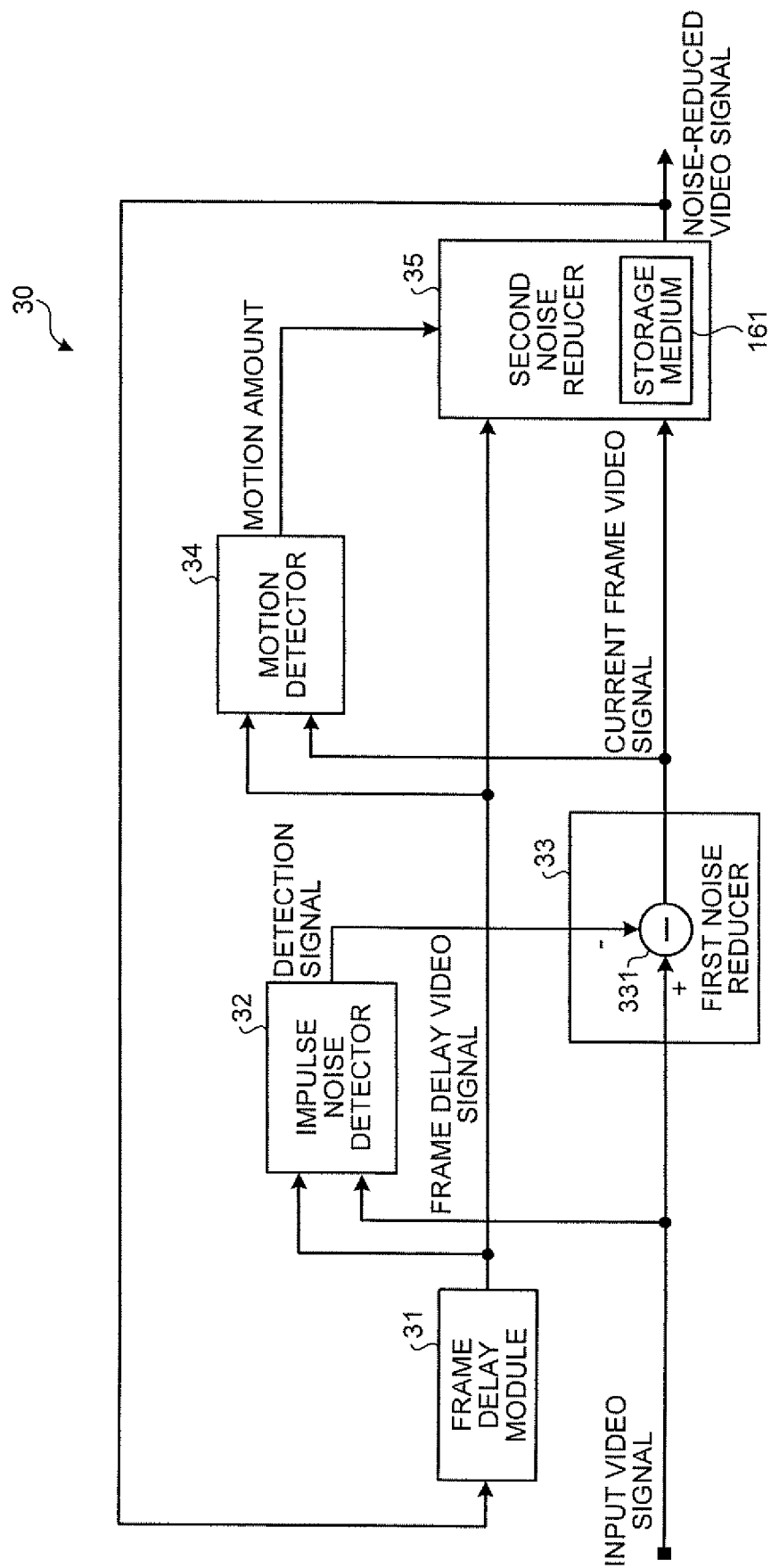
FIG. 8 is an exemplary block diagram of a noise reduction circuit according to a second embodiment of the invention.

FIG. 8 is a block diagram of a noise reduction apparatus 30 according to the second embodiment. As illustrated in FIG. 8, the noise reduction apparatus 30 comprises a frame delay module 31, an impulse noise detector 32, a first noise reducer 33, a motion detector 34, and a second noise reducer 35. The noise reduction apparatus 30 is of loop type, in which the output of the second noise reducer 35 is input to the frame delay module 31.

The frame delay module 31 is a frame memory or the like that stores one frame of a video signal (a noise-reduced video signal described later) received from the second noise reducer 35, and outputs it to the impulse noise detector 32 as a frame delay video signal that is delayed by one frame from an input video signal input thereto from the outside. The noise components of the video signal received from the second noise reducer 35 have been reduced by the first noise reducer 33 and the second noise reducer 35.

The impulse noise detector 32 receives the frame delay video signal from the frame delay module 31 as well as an input video signal from the outside. The impulse noise detector 32 detects impulse noise in the input video signal based on a frame difference signal obtained by subtracting the frame delay video signal from the input video signal. The impulse noise detector 32 is of basically the same configuration and operates in a similar manner as the first impulse noise detector 12 illustrated in FIG. 2, and is not described in further detail. The output signal of the impulse noise detector 32 is hereinafter referred to as a detection signal.

The first noise reducer 33 comprises a subtractor 331. The subtracter 331 generates a current frame video signal by reducing impulse noise in the input video signal based on the detection result (the detection signal) obtained by the impulse noise detector 32. More specifically, the subtracter 331 subtracts the detection signal component from the input video signal to thereby remove impulse noise from the input video signal, and outputs it as the current frame video signal.

The motion detector 34 compares the current frame video signal received from the first noise reducer 33 with the frame delay video signal. The motion detector 15 detects the amount of motion in the video from the frame delay video signal to the current frame video signal based on the comparison, and outputs the motion amount to the second noise reducer 35. The motion detection of the motion detector 34 may be implemented using known or commonly used technologies such as an iterative gradient method or a block matching method.

The second noise reducer 35 performs noise reduction on the output (the current frame video signal) from the first noise reducer 33 to reduce noise components other than impulse noise with intensity corresponding to the motion amount received from the motion detector 15. The second noise reducer 35 outputs a resultant signal to the frame delay module 31 as well as to the outside as a noise-reduced video signal.

More specifically, the second noise reducer 35 performs noise reduction on the current frame video signal to achieve a higher noise reduction effect as the state of video indicated by the motion amount is closer to the static state (motion amount: 0). On the other hand, the second noise reducer 35 performs noise reduction so that the noise reduction effect is lower as the motion amount increases. It is herein assumed that the level of noise reduction effect is predetermined for each motion amount, and that the second noise reducer 35 is provided with the storage medium 161 such as ROM that stores in advance the noise reduction effect level in association with each motion amount as setting information.

As described above, according to the second embodiment, the noise reduction apparatus 30 detects the motion of video based on an input video signal (a current frame video signal) from which impulse noise has been reduced and a frame delay video signal from which impulse noise and other noise components have been reduced. The noise reduction apparatus 30 performs noise reduction on the current frame video signal with intensity corresponding to the motion amount. Accordingly, the noise reduction apparatus 30 can reduce impulse noise components as well as other noise components from the input video signal with intensity corresponding to the video signal. Thus, it is possible to achieve a noise reduction effect suitable for the input video signal, and thereby improve the image quality of the input video signal.

Moreover, as compared to the noise reduction apparatus 10 of the first embodiment, the noise reduction apparatus 30 of the second embodiment has less components or elements. Therefore, it is possible to reduce the manufacturing cost.

While, in the example of FIG. 8, the frame delay video signal is input to the second noise reducer 35, it may not be input thereto when noise reduction is performed on the current frame video signal without using the frame delay video signal.

In the second embodiment also, the noise reduction effect level may be controlled according to the state of video as in the first embodiment. That is, the state of video may be classified into two states, i.e., static state and moving state, according to the motion amount so that noise reduction can be performed with intensity corresponding to either one of the states.

Described below is a video apparatus to which is applied the noise reduction circuit (the noise reduction apparatus 10 or the noise reduction apparatus 30) of the first embodiment or the second embodiment.

Figure 9:
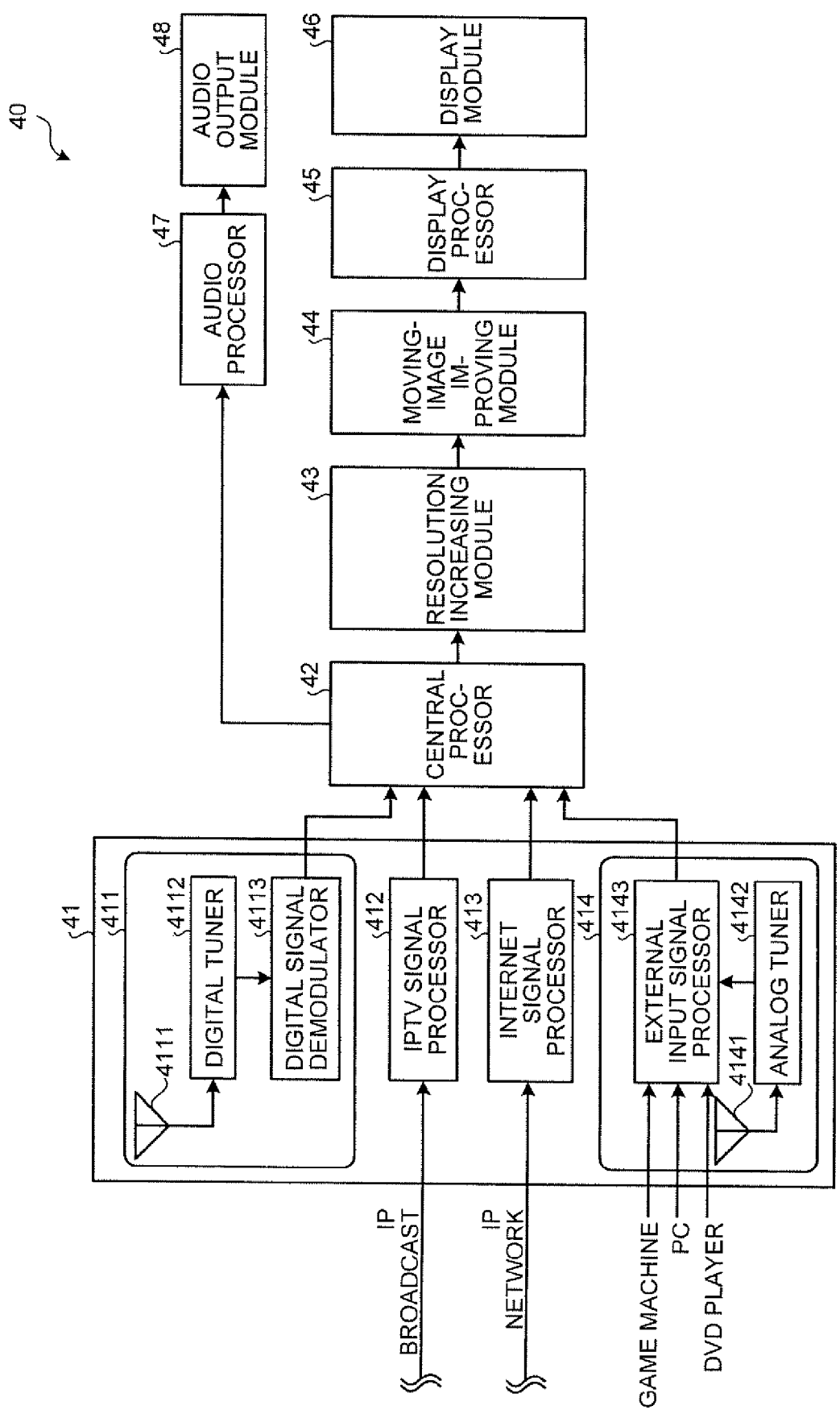
FIG. 9 is an exemplary block diagram of a video apparatus to which is applied the noise reduction circuit of the first embodiment or the second embodiment.

FIG. 9 is a block diagram of an example of an image display apparatus 40 to which is applied the noise reduction circuit of the first embodiment or the second embodiment. As illustrated in FIG. 9, the image display apparatus 40 comprises a video signal input module 41, a central processor 42, a resolution increasing module 43, a moving-image improving module 44, a display processor 45, a display module 46, an audio processor 47, and an audio output module 48.

The video signal input module 41 comprises a digital broadcast receiver 411, an Internet protocol television (IPTV) signal processor 412, an Internet signal processor 413, and an external input module 414. The digital broadcast receiver 411 receives an video signal to be displayed. The Internet signal processor 413 receives data transmitted through an IP network such as the Internet. The external input module 414 receives input of an analog signal. The term "video signal" as used herein includes audio signals as well as image signals such as still image signals and moving image signals.

The digital broadcast receiver 411 comprises a digital antenna 4111, a digital tuner 4112, and a digital signal demodulator 4113. The digital antenna 4111 receives digital broadcasting such as BS broadcasting, CS broadcasting, and digital terrestrial broadcasting. The digital tuner 4112 is used to select a digital broadcast channel. The digital signal demodulator 4113 demodulates a digital broadcast signal, and outputs it to the central processor 42 as a digital video signal.

The IPTV signal processor 412 receives IP broadcasting transmitted over a dedicated IP network, and outputs it to the central processor 42 as a digital video signal.

The Internet signal processor 413 receives data (still image, moving image, etc.) transmitted through an IP network such as the Internet, and outputs it to the central processor 42 as a digital video signal.

The external input module 414 comprises an analog antenna 4141, an analog tuner 4142, and an external input signal processor 4143. The analog antenna 4141 receives analog broadcasting. The analog tuner 4142 is used to select an analog broadcast channel. The external input signal processor 4143 performs signal processing, such as A/D conversion, on an analog signal, and outputs it to the central processor 42 as a digital video signal. The external input signal processor 4143 is provided with a terminal (not shown) for connection to an external device such as a game machine, a personal computer (PC), a digital versatile disk (DVD) player. The external input signal processor 4143 performs the signal processing also on an analog signal received from an external device through the terminal.

The central processor 42 separates an audio signal from the video signal received from the video signal input module 41. After performing predetermined signal processing on the video signal, the central processor 42 outputs it to the resolution increasing module 43. Examples of the signal processing performed by the central processor 42 include decoding to decode a compressed and encoded input signal, and format conversion to convert the format of an input video signal to a predetermined format.

Figure 10:
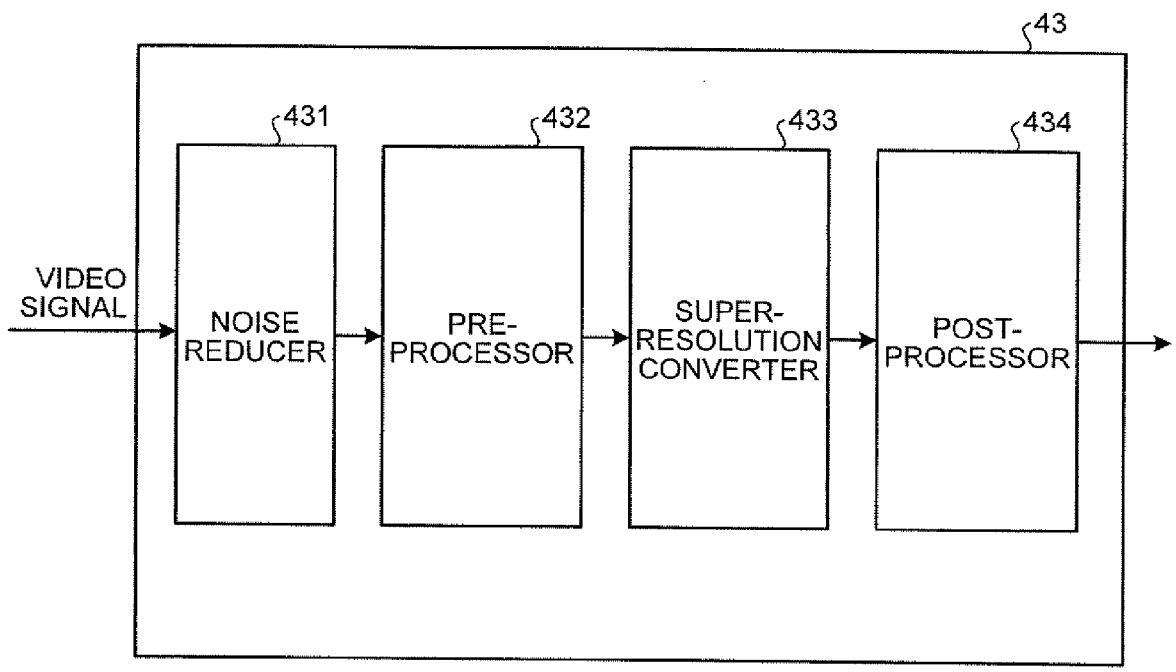
FIG. 10 is an exemplary detailed block diagram of a resolution increasing module illustrated in FIG. 9.

FIG. 10 is a functional block diagram of the resolution increasing module 43. As illustrated in FIG. 6, the resolution increasing module 43 comprises a noise reducer 431, a preprocessor 432, a super-resolution converter 433, and a postprocessor 434.

The noise reducer 431 is a functional module to which is applied the noise reducer of the first or second embodiment. The noise reducer 431 removes noise components in a video signal received from the central processor 42, and outputs it to the preprocessor 432.

The preprocessor 432 performs image processing on the video signal received from the noise reducer 431, and then outputs it to the super-resolution converter 433. Examples of the image processing include interlace/progressive conversion (hereinafter, "IP conversion") and scaling. As the IP conversion, the preprocessor 432 detects motion of an image in the video signal and determines whether the image is a still image or a moving image. When the image is a still image, the preprocessor 432 performs still-image interpolation. When the image is a moving image, the preprocessor 432 performs moving-image interpolation.

The super-resolution converter 433 performs image processing (hereinafter, "super-resolution conversion") on the video signal received from the preprocessor 432 to increase the resolution, thereby generating a high-resolution video signal in HD size or the like. The super-resolution converter 433 outputs the high-resolution video signal to the post-processor 434.

The term "super-resolution conversion" as used herein refers to image processing, in which, from a video signal with low resolution, i.e., first resolution, an original pixel value is estimated to increase the pixels and thus to restore a video signal with high resolution, i.e., second resolution. The original pixel value refers to the value of each pixel of a video signal obtained by, for example, photographing the same object as that of an image with low resolution (first resolution) with a camera having high-resolution pixels and capable of capturing an image with high resolution (second resolution). Besides, "original pixel value is estimated to increase pixels" means to obtain the characteristics of a correlated image, and estimate an original pixel value from neighboring images (in the same frame or between frames) using the characteristics to increase pixels.

The super-resolution conversion may be performed using known or commonly used technologies as disclosed in, for example, Japanese Patent Application Publication (KOKAI) Nos. 2007-310837, 2008-98803, and 2000-188680. In the embodiment, the super-resolution conversion uses a technology of, for example, restoring an image with frequency components above the Nyquist frequency determined by the sampling rate of an input image.

If, for example, employing the super-resolution conversion disclosed in Japanese Patent Application Publication (KOKAI) No. 2007-310837, the super-resolution converter 433 sets a target pixel in each of a plurality of low-resolution video signals (low-resolution frames), and sets a target image area so that it contains the target pixel. The super-resolution converter 433 selects a plurality of correspondent points that correspond to a plurality of target image areas closest to a variation pattern of the pixel value in the target image area from the reference frame. The super-resolution converter 433 sets a sample value of luminance on a correspondent point to the pixel value of a corresponding target pixel. The super-resolution converter 433 calculates a pixel value for a high-resolution frame having more pixels than the reference frame and corresponding to the reference frame based on the size of a plurality of sample values and layout of the correspondent points. Thus, the super-resolution converter 433 estimates an original pixel value from a low-resolution video signal, and increases pixels to restore a high-resolution video signal.

If employing the super-resolution conversion using self-congruency position search in the same frame image disclosed in Japanese Patent Application Publication (KOKAI) No. 2008-98803, the super-resolution converter 433 calculates a first pixel position with the smallest error, i.e., a first error, by comparing errors of respective pixels in a search area of a low-resolution frame. The super-resolution converter 433 calculates a position with the smallest error in the search area with decimal precision based on the first pixel position and the first error, and a second pixel position around a first pixel and a second error thereof. The super-resolution converter 433 calculates a decimal-precision vector that has its end point at the position and its start point at a pixel of interest. The super-resolution converter 433 calculates an extrapolation vector of the decimal-precision vector that has its end point at a pixel on a screen which is not in the search area based on the decimal-precision vector. The super-resolution converter 433 calculates a pixel value for a high-resolution image having more pixels than image data based on a pixel value obtained from the image data, the decimal-precision vector, and the extrapolation vector. In this manner, the super-resolution converter 433 estimates an original pixel value from a low-resolution video signal, and increases pixels to restore a high-resolution video signal.

The super-resolution converter 433 may employ the super-resolution conversion disclosed in Japanese Patent Application Publication (KOKAI) No. 2000-188680 using mapping between a plurality of frames.

The above technologies of the super-resolution conversion are cited by way of example and not by way of limitation. The super-resolution converter 433 may employ various other technologies in which an original pixel value is estimated from a low-resolution video signal to increase pixels to thereby restore a high-resolution video signal.

The post-processor 434 performs image correction such as gamma correction on the video signal received from the super-resolution converter 433, and outputs it to the moving-image improving module 44 at the latter stage.

Referring back to FIG. 9, the moving-image improving module 44 generates an intermediate frame from the video signal received from the resolution increasing module 43. With this, the moving-image improving module 44 increases the number of frames per second of the video signal to a predetermined value. For example, if receiving a video signal at 60 fps from the resolution increasing module 43, the moving-image improving module 44 generates an intermediate frame from video of each of 60 frames. Thus, the moving-image improving module 44 generates a video signal at 120 fps, and outputs it to the display processor 45.

The display processor 45 is a display driver or the like, and controls the display on the display module 46 of the video signal received from the moving-image improving module 44. The display module 46 is a display device such as a liquid crystal display (LCD) panel, a plasma panel, or a surface-conduction electron-emitter display (SED) panel. The display module 46 displays an image corresponding to the video signal on the screen under the control of the display processor 45.

The audio processor 47 converts the audio signal separated by the central processor 42 into an analog signal in a format reproducible by the audio output module 48, and outputs the analog signal to the audio output module 48. The audio output module 48 is a speaker or the like, and outputs the analog signal received from the audio processor 47 as audio.

In the image display apparatus 40, noise components such as impulse noise can be removed from a video signal by the noise reducer 431 of the resolution increasing module 43 corresponding to the noise reduction apparatus 10 or the noise reduction apparatus 30. With this configuration, noise components are removed from a video signal before the processing by the super-resolution converter 433, which prevents noise components from being enhanced due to the sharpening process performed by the super-resolution converter 433. Accordingly, it is possible to reliably reduce impulse noise, which is especially prominent in a video image, as well as other noise components. Thus, a clear video image can be displayed.

Although the noise reduction circuit of the embodiments are described above as being applied to the image display apparatus 40, it can be applied to other video apparatuses such as an HDD recorder and a video camera.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A noise reduction apparatus comprising:
   a frame delay module configured to, upon receiving an input video signal in frame units from outside, delay the input video signal by one frame to obtain a frame delay video signal;
   a first impulse noise detector configured to generate a frame difference signal by subtracting the frame delay video signal from the input video signal and detect an impulse noise component in the frame difference signal;
   a second impulse noise detector configured to generate a frame difference signal by subtracting the input video signal from the frame delay video signal and detect an impulse noise component in the frame difference signal;
   a first impulse noise reducer configured to generate a current frame video signal by reducing the impulse noise component in the input video signal based on a detection result obtained by the first impulse noise detector;
   a second impulse noise reducer configured to generate a previous frame video signal by reducing the impulse noise component in the frame delay video signal based on a detection result obtained by the second impulse noise detector;
   a motion detector configured to detect motion in video from the current frame video signal and the previous frame video signal to obtain a motion amount indicating an amount of the motion; and
   a noise reducer configured to perform noise reduction on the current frame video signal to reduce noise components other than the impulse noise component with intensity corresponding to the motion amount to generate a noise-reduced video signal.

2. The noise reduction apparatus of claim 1, wherein the noise reducer is configured to perform the noise reduction with higher intensity as state of the video indicated by the motion amount is closer to static state.

3. The noise reduction apparatus of claim 1, wherein the noise reducer is configured to perform the noise reduction with lower intensity as the motion amount increases.

4. The noise reduction apparatus of claim 1, wherein the noise reducer is configured to determine whether the video is in static state or moving state based on the motion amount, and perform the noise reduction with intensity corresponding to either the static state or the moving state based on a determination result.

5. A noise reduction apparatus comprising:
   a frame delay module configured to delay a video signal in frame units by one frame to obtain a frame delay video signal;
   an impulse noise detector configured to generate a frame difference signal by subtracting the frame delay video signal from an input video signal received in frame units from outside and detect an impulse noise component in the frame difference signal;
   an impulse noise reducer configured to generate a current frame video signal by reducing the impulse noise component in the input video signal based on a detection result obtained by the impulse noise detector;
   a motion detector configured to detect motion in video from the current frame video signal and the frame delay video signal to obtain a motion amount indicating an amount of the motion; and
   a noise reducer configured to perform noise reduction on the current frame video signal to reduce noise components other than the impulse noise component with intensity corresponding to the motion amount to generate a noise-reduced video signal, wherein the noise-reduced video signal is input to the frame delay module as the video signal.

6. The noise reduction apparatus of claim 5, wherein the noise reducer is configured to perform the noise reduction with higher intensity as state of the video indicated by the motion amount is closer to static state.

7. The noise reduction apparatus of claim 5, wherein the noise reducer is configured to perform the noise reduction with lower intensity as the motion amount increases.

8. The noise reduction apparatus of claim 5, wherein the noise reducer is configured to determine whether the video is in static state or moving state based on the motion amount, and perform the noise reduction with intensity corresponding to either the static state or the moving state based on a determination result.

9. A noise reduction method comprising:
   a frame delay module delaying, upon receipt of an input video signal in frame units from outside, the input video signal by one frame to obtain a frame delay video signal;
   a first impulse noise detector generating a frame difference signal by subtracting the frame delay video signal from the input video signal and detecting an impulse noise component in the frame difference signal;
   a second impulse noise detector generating a frame difference signal by subtracting the input video signal from the frame delay video signal and detecting an impulse noise component in the frame difference signal;
   a first impulse noise reducer generating a current frame video signal by reducing the impulse noise component in the input video signal;
   a second impulse noise reducer generating a previous frame video signal by reducing the impulse noise component in the frame delay video signal;
   a motion detector detecting motion in video from the current frame video signal and the previous frame video signal to obtain a motion amount indicating an amount of the motion; and
   a noise reducer performing noise reduction on the current frame video signal to reduce noise components other than the impulse noise component with intensity corresponding to the motion amount to generate a noise-reduced video signal.

* * * * *